No. 735,386. PATENTED AUG. 4, 1903.
J. D. IHLDER.
MEANS FOR CONTROLLING ELECTRIC MOTORS.
APPLICATION FILED APR. 19, 1899.
NO MODEL. 6 SHEETS—SHEET 1.

Witnesses
Inventor
John D. Ihlder
Attorneys

No. 735,386. PATENTED AUG. 4, 1903.
J. D. IHLDER.
MEANS FOR CONTROLLING ELECTRIC MOTORS.
APPLICATION FILED APR. 19, 1899.
NO MODEL. 6 SHEETS—SHEET 2.

No. 735,386. PATENTED AUG. 4, 1903.
J. D. IHLDER.
MEANS FOR CONTROLLING ELECTRIC MOTORS.
APPLICATION FILED APR. 19, 1899.
NO MODEL. 6 SHEETS—SHEET 4.

No. 735,386. Patented August 4, 1903.

UNITED STATES PATENT OFFICE.

JOHN D. IHLDER, OF YONKERS, NEW YORK, ASSIGNOR TO THE OTIS ELEVATOR COMPANY, OF ORANGE, NEW JERSEY, A CORPORATION OF NEW JERSEY.

MEANS FOR CONTROLLING ELECTRIC MOTORS.

SPECIFICATION forming part of Letters Patent No. 735,386, dated August 4, 1903.

Application filed April 19, 1899. Serial No. 713,593. (No model.)

*To all whom it may concern:*

Be it known that I, JOHN D. IHLDER, a citizen of the United States, residing at Yonkers, in the county of Westchester and State of New York, have invented certain new and useful Improvements in Means for Controlling Electric Motors, of which the following is a specification.

My invention relates to means for controlling the operation of electric motors, and while it is applicable to motors used for many and various purposes it is more especially adapted for controlling motors connected to operate elevators, and it is especially adapted for controlling electric motors operated with alternating currents.

The object of the invention is to provide improved and practical means whereby an alternating-current motor can be readily started, stopped, and its operation controlled, and to these ends the invention consists in the various features of construction and arrangement of parts, having the general mode of operation substantially as hereinafter more particularly pointed out.

Referring to the accompanying drawings, Fig. 10ª is an enlarged detail showing one preferred construction of the contacts used. Figs. 11 and 12 are diagrammatic views showing the arrangements of circuits for single or multiphase currents.

While my invention is applicable to many and various uses in connection with alternating-current electric motors, the general principles of the invention can be well understood by describing and illustrating the embodiments thereof connected with motors adapted to operate elevators, and I will proceed to describe the embodiment illustrated in the drawings in connection with elevators as a typical embodiment, so that those skilled in the art will be enabled to employ my invention for the various purposes to which it is adapted, and it will be understood that in thus describing this special application I do not limit the invention thereto nor to the use of the particular styles or forms of devices referred to.

The arrangements of circuits illustrated herein are based on an arrangement of a single push-button system of control, substantially such as is shown and described in my Patent No. 710,914, dated October 7, 1902; but it is understood that these circuits may be varied, so that a double or three push-button system may be employed or any other equivalent means for controlling the circuits. Further, it will be seen hereinafter that in connection with the push-button system I use electromagnets for controlling the circuits through the different devices, which magnets are similar to those illustrated, described, and claimed in my Patent No. 612,629, of October 18, 1898, and while these are the preferred devices and arrangement of circuits other arrangements and devices may be used to accomplish the general purpose of my invention, as will be apparent to those skilled in the art.

Referring to the drawings of the mechanical part of the invention, there is a suitable base A, upon which is mounted an alternating-current motor B of any desired type. The armature of this motor is connected directly or otherwise to the driving-shaft B', which in the present instance is shown as provided with a worm B², engaging a worm-wheel A', connected to a winding-drum A² or other part of the elevator-operating mechanism. Mounted on the driving-shaft B' is a brake-wheel B³, and the brake may be of any ordinary or usual construction, but is shown in the present instance as embodying an improved construction hereinafter more particularly described and which is arranged to coöperate with the switch mechanism for controlling the circuits of the motor B. Mounted on the shaft A³ of the drum is an automatic stop-motion device A⁴, which may be of any usual construction and is connected, as hereinafter described, to control the switch—as, for instance, when the elevator reaches its uppermost or lowermost position. These general features of the elevator-operating mechanism need not be further described in detail, as their construction and arrangement are well understood and may be varied to suit any particular case.

Arranged in proper relation to the elevator-operating mechanism and preferably, as shown, mounted on the base A is a reversing-switch device E, and this in the present instance is arranged to be operated in connection with the brake-operating magnets D and D'. Also arranged to coöperate with the reversing-switch is a stop-magnet F, and this is shown as conveniently mounted on the reversing-switch E.

For use in connection with single-phase currents I have found it desirable to employ a governor-switch G; but with multiphase currents this switch is not necessary and may be omitted.

It will be understood that when the motor or elevator is at rest the brake is applied, and when the elevator is to be started the brake is released and maintained in the released condition as long as the proper current is supplied to operate the elevator, and when the current is cut off or fails for any reason the brake device is automatically applied to stop the car. As the operation of the brake device is thus in harmony with the starting and stopping of the elevator, I have utilized in the present instance the brake-operating magnets not only to operate the brake, but to operate and control the reversing-switch device E, and I will now proceed to describe the improved brake device shown herein.

Figure 1:
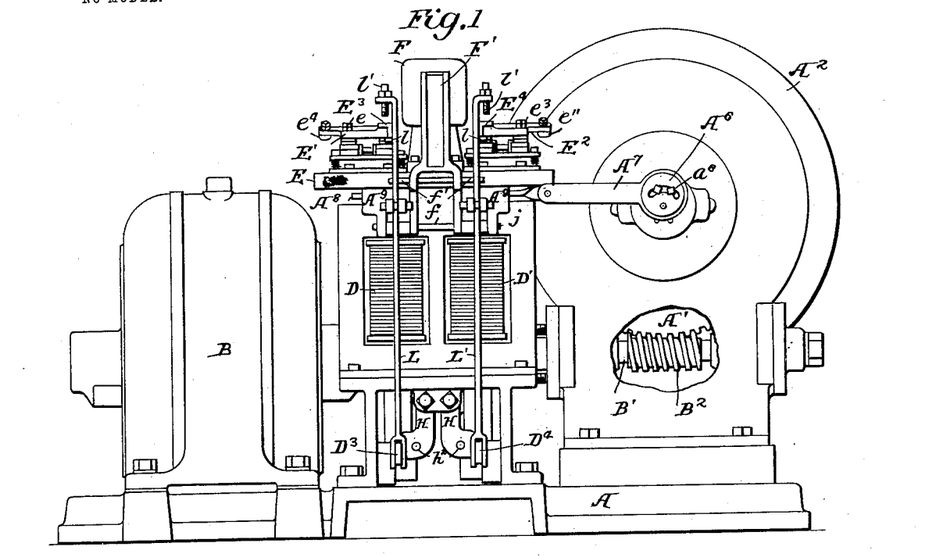
Figure 1 is a side view of an elevator-motor embodying my improvements.
Figure 2:
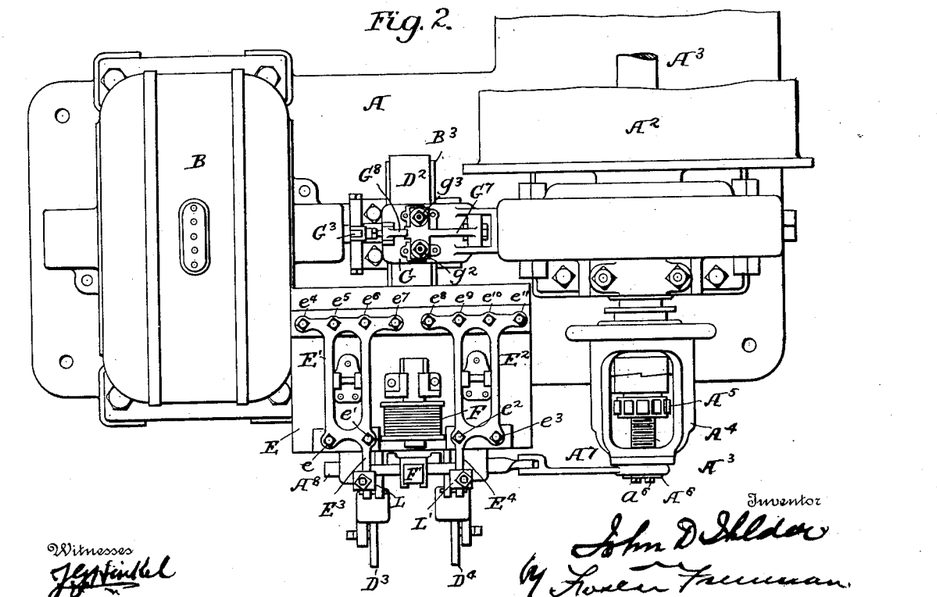
Fig. 2 is a plan view thereof.
Figure 3:
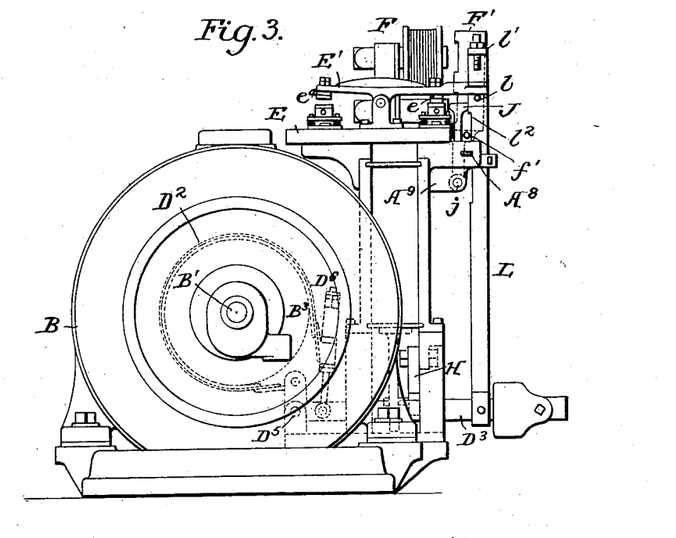
Fig. 3, an end view of the same.

The brake-wheel $B^3$ is, as is usual in this class of devices, provided with a brake-band $D^2$, and in order to get the maximum brake-power out of the brake-band I provide means whereby one end of the brake-band is anchored whenever the other end is operated. Thus I have shown the opposite ends of the band attached, respectively, to two weighted levers $D^3$ $D^4$, and these are pivoted, as at $D^5$, and connected to the ends of the band in such a way that in descending either or both of the levers shorten the band and cause it to tightly grasp the brake-wheel $B^3$. Thus one end of the band is attached to one arm of the bell-crank lever $D^3$, while the other end of the band is attached to the straight lever $D^4$, and suitable means, as an adjusting-screw $D^6$, is provided for adjusting the relations of the levers to the band. It will be seen that when these levers are down, as shown in Fig. 3, the brake-band tightly embraces the brake-wheel $B^3$; but it will also be seen that power exerted on the brake-band by the rotation of the brake-wheel in either direction would tend to raise one or the other of the levers, and the band would not, therefore, operate effectively as a brake, and to prevent this I provide some suitable means for normally holding the brake-levers in their downward position with the brake applied, and I have shown the catches H H' pivotally mounted, as indicated, and provided or arranged so that they normally swing to such a position that their catch-points $h$ $h'$ will engage the weighted levers $D^3$ $D^4$, respectively, and prevent their rising to release the brake-band.

To operate the brake-levers to release the brake-band, I provide the brake-magnets D and D', which in the present instance are shown in the form of solenoids having cores $D^7$ $D^8$, with slots $d$ $d'$, through which the levers $D^3 D^4$, respectively, extend. These slots are preferably larger than the size of the levers, so as to allow the magnet-cores a certain amount of motion before the levers are raised. The cores are also provided with some means for releasing the catches H H', and in the present instance I have shown wedge-shaped projections $d^2$, adapted to engage pins or studs $h^2$ on the catches H H', and it will be seen by reference to Fig. 4 especially that when either of the cores $D^7$ or $D^8$ begins to move upward the wedge-shaped projection $d^2$, operating against one of the pins or studs $h^2$, forces the catch H or H', as the case may be, inward, so that its catch-point $h$ or $h'$ will be disengaged from its brake-lever $D^3$ or $D^4$, the elongated slots allowing this operation, as above indicated. When the catch releases the lever, a further movement of its magnet-core will raise the same, releasing the brake-band on the brake-wheel, and it will remain released as long as the magnet is energized. When, however, the core of the magnet descends, through the influence of the weighted lever, the brake-band is applied and the catch again engages the lever and holds it in position.

Figure 4:
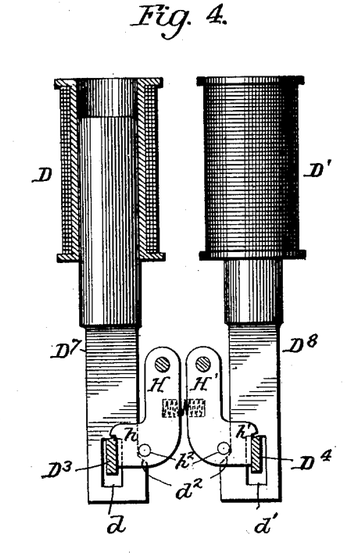
Figs. 4, 5, 6, and 7 are enlarged detail views of some of the operating parts.
Figure 5:
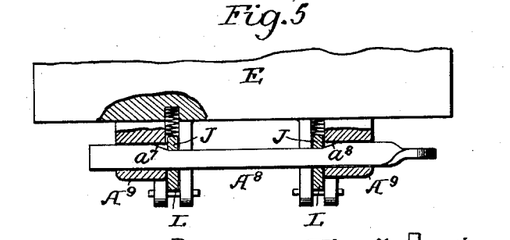
Figure 6:
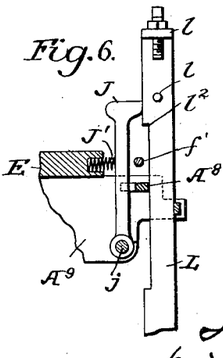

I preferably leave a slight space between the catch-points $h$ $h'$ and the respective brake-levers, as indicated in Fig. 4, although this is not necessary; but it will be seen that in whichever direction the brake-wheel may rotate as soon as the brake-band is brought in contact with it the tendency will be to lift the brake-lever connected to the end of the brake-band extending in a direction opposite to that of the movement of the brake-wheel, and this tendency will be overcome by the catch, which will prevent the lever from rising materially and will hold the brake-band stationary, while the weighted lever at the other end of the band coöperates therewith to cause the band to tightly grasp the wheel, and the slot in the magnet-core is of sufficient size to allow this brake-lever to play a little and compensate for the slight upward movement of the other lever.

The reversing-switch E may be variously constructed, depending somewhat upon the character of the currents used; but, as shown, it comprises, essentially, two switch-arms E' $E^2$, pivotally mounted on the switch-plate and carrying contacts at both ends. The number of these contacts will vary according to the arrangement of the circuits, and I preferably use yielding spring-contacts, as indicated in the drawings. In the present instance each reversing-switch arm is provided with two contacts $e$ $e'$ and $e^2$ $e^3$ on one end and with contacts $e^4$ $e^5$ $e^6$ $e^7$ and $e^8$ $e^9$ $e^{10}$ $e^{11}$ at their other ends, controlling circuits which will be more clearly shown in the diagrams. The contacts $e$ $e'$ and $e^2$ $e^3$ are normally closed, and when either of the switch-arms $E'$ $E^2$ is operated these contacts are broken and the contacts at the other end of the arm are closed. In the present instance I utilize the brake-magnets $D$ $D'$ for controlling the switch-arms $E'$ $E^2$, and as a convenient means I have shown links $L$ $L'$ as connected, respectively, to the brake-levers $D^3$ $D^4$ and engaging through suitable devices, as pins $l$, the extensions $E^3$ $E^4$ of the switch-arms $E'$ $E^2$. The links are also provided, preferably, with an adjusting-stop $l'$, so that the links may have a certain amount of downward movement before they break the circuit by operating the switch-arms.

In order to relieve the brake-magnets $D$ $D'$ of the necessity of holding the brake-levers in their elevated positions, I preferably provide means for holding the levers elevated, and I have shown the links $L$ $L'$ as provided with notches $l^2$, adapted to coöperate with a catch $J$, which, as shown, is pivoted at $j$ and is under the stress of a spring $J'$, so that it will enter the notch $l^2$ of the respective links as they are moved upward and hold them in this position until released. It will thus be seen that whenever either one of the brake-magnets $D$ or $D'$ is energized it first moves its core to operate the catch $H$ or $H'$ to release the brake-lever $D^3$ or $D^4$ and to raise the same, and through the medium of the links $L$ $L'$ one or the other of the reversing-switch arms is operated to break the circuit normally made and close the circuits, which, as hereinafter described, will produce the proper operation of the motor to raise or lower the elevator, as the case may be, and the brake-lever is then supported by the catch $J$ engaging the link $L$ and the motor continues to operate. When, however, it is desired or necessary to stop the motor, various safety devices, such as are ordinarily used in connection with elevators, may be adapted to accomplish this result, and in the present instance I have shown a stop-magnet $F$, suitably connected in the circuit and arranged to disengage the catch $J$ from the links. Thus in the present instance the armature $F'$ is pivoted at $f$ and is provided with studs or projections $f'$, adapted to engage the catch $J$ when the magnet is energized and withdraw it from the notch $l^2$ in the link when the latter falls by the influence of the weighted brake-lever to which it is attached, and the brake is applied and the switch-arm of the reversing-switch operated to break the working circuit and restore the contacts to their normal positions.

I have also shown an arrangement whereby the usual automatic stop-motion device $A^4$ can operate the links to break the circuit and apply the brakes. The description of the automatic stop-motion need not be set forth in detail, as it is well understood, the general features being that there is a traveling clutch member $A^5$, traveling on a screw-threaded extension of the shaft $A^3$ and arranged so that when the elevator reaches its extreme position at either end of its travel the clutch will become engaged and automatically operate the switch mechanism.

Mounted on the automatic stop-motion device $A^4$ is an eccentric $A^6$, and this is adjustable with relation thereto by suitable adjusting-screws and slot $a^6$. Engaging this eccentric is a strap $A^7$, connected to a bar $A^8$, moving in bearings $A^9$. This bar $A^8$ has inclines $a^7 a^8$ arranged in proper relation to the catches $J$, and when the bar $A^8$ is moved to the right or left it will release the one or the other of the catches, permitting the links to fall, the reversing-switch to be operated, and the brake to be applied to stop the motor.

Figure 7:
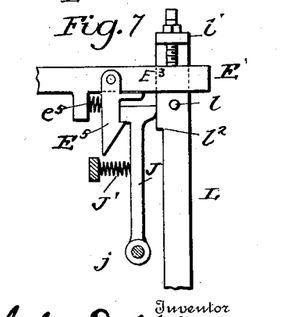
Figure 8:
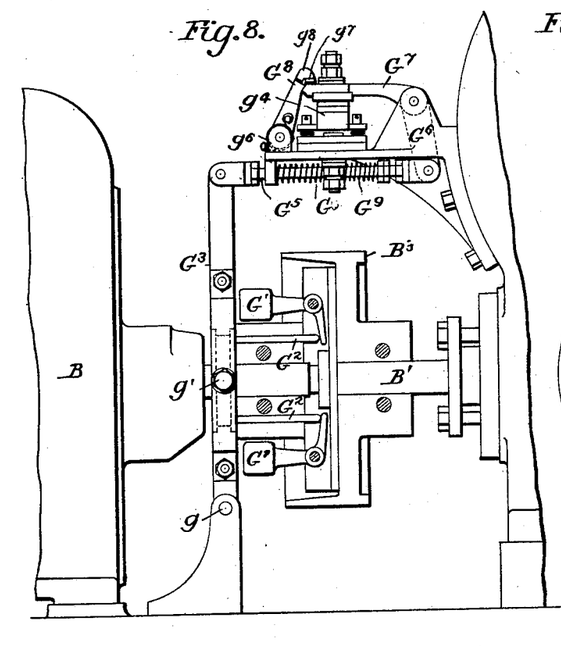
Fig. 8 is an enlarged side view of the governor-switch.
Figure 9:
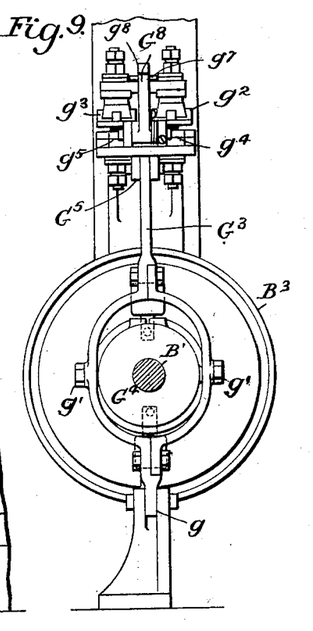
Fig. 9 is an end view of the same.

As it is sometimes desirable to lock the reversing-switch, in Fig. 7 I have shown a slight modification whereby this is accomplished, wherein the parts are lettered as before. In this case the reversing-switch arm $E'$ is provided with a pivoted catch $E^5$, under the stress of a spring and adapted to be engaged by the head of the catch $J$, so that the switch-arm is securely held until the link $L$ rises sufficiently to allow the head of the catch to pass by the notch $l^2$ thereon, when the arm is released and the switch can be operated.

As above intimated, when multiphase currents are used the devices so far described are found sufficient and satisfactory; but for use with single-phase currents, wherein it is necessary in starting the single-phase motor to provide an additional circuit through the motor in the usual way, I make use of a governing device $G$, which is adapted to break the additional circuit of the motor when the motor attains sufficient speed to operate by the operating-current. This governing device is arranged in any convenient relation to the motor, but is shown herein as operating in connection with the brake-wheel $B^3$. This governor in the present instance consists, essentially, of the weighted arms $G'$, pivotally mounted in the brake-wheel $B^3$ and operating against pins $G^2$, which in the present instance are arranged to move an arm $G^3$, pivoted at $g$. In the present instance connected to the arm $G^3$ is a disk $G^4$, supported on the arm by adjusting-screws $g'$ and sliding on the shaft $B'$. Connected to this arm $G^3$ is a rod $G^5$, the free end of which is connected to the rock-arm $G^6$, one end of which, as $G^7$, carries the contacts $g^2 g^3$, adapted to engage contacts $g^4 g^5$, which are, as shown, spring-contacts. Adapted to engage the end $G^7$ is a catch $G^8$, which is normally under the stress of a spring $g^6$, and catch $G^8$ carries an insulated contact $g^8$, which engages an insulated contact $g^7$ on the arm $G^7$. Mounted on the rod $G^5$ is a compression-spring $G^9$, which tends to hold the arm $G^3$ in its upright position and force the pins $G^2$ against the weighted arms $G'$. The contacts $g^2$ $g^4$, $g^3$ $g^5$, and $g^7$ $g^8$ are normally closed when the current is supplied to the motor for starting, and as the shaft $B'$ increases its speed the weighted arms $G'$ move outward and through the medium of the pins $G^2$ force the arm $G^3$ against the resistance of the compression-spring $G^9$, and as this spring is compressed first contacts $g^7$ $g^8$ are separated, then the contacts $g^2$ $g^3$ are gradually raised without breaking, owing to the spring-contacts $g^4$ $g^5$ being able to follow and maintain contact for a certain distance. The catch $G^8$ is gradually forced out of engagement with the end $G^7$ of the rock-arm $G^6$ until it finally releases said arm, and when this moment arrives the weighted arms of the governor have only to overcome the opposition of the compression-spring $G^9$, being relieved of the spring $g^6$ on the catch $G^8$, and they will rapidly move to a further position outward and cause a quick break between the contacts $g^2 g^3$ and $g^4 g^5$, which latter have reached the limit of movement under the spring-pressure. The circuit controlled by the governor is thus broken and remains broken as long as the motor is operating at proper speed; but when the motor stops the weighted arms of the governor assume their normal positions under the stress of the compression-spring $G^9$, and the rock-arm $G^6$, carrying the contacts, is forced to its normal position to engage the contacts with the spring-contacts, and the spring-actuated catch $G^8$ engages the end $G^7$, the insulated contacts $g^7$ $g^8$ are engaged, and the parts are locked in position ready to operate again as before.

Figure 10:
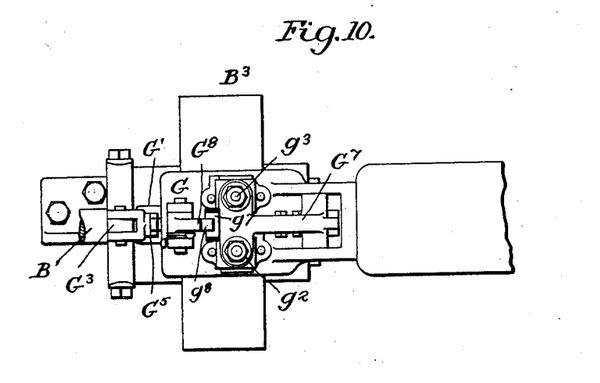
Fig. 10 is a plan view of the same.
Figures 10A, 12:
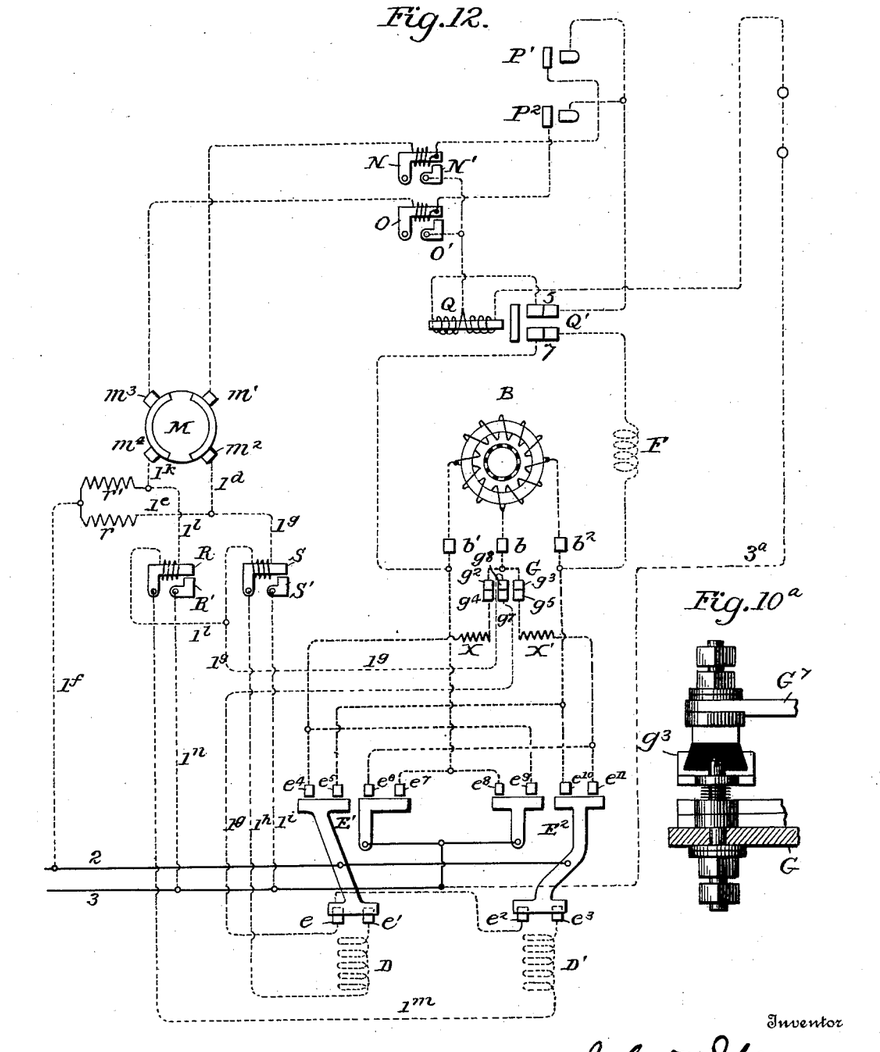
Figure 11:
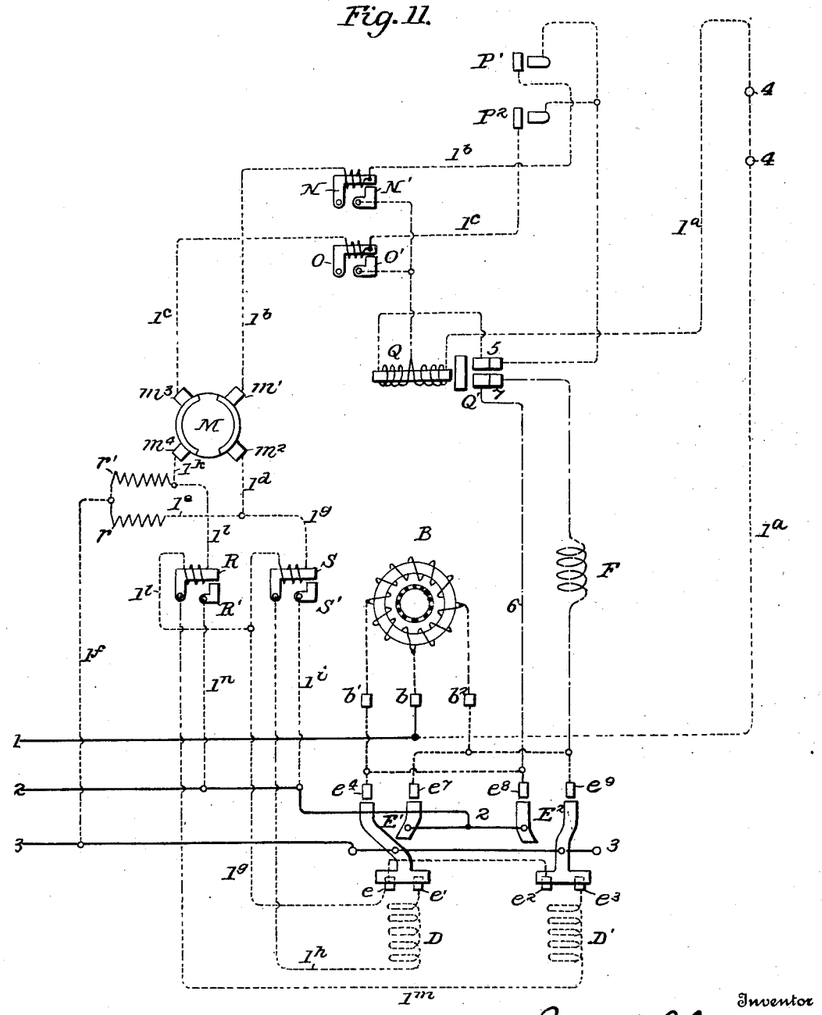
Figure 13:
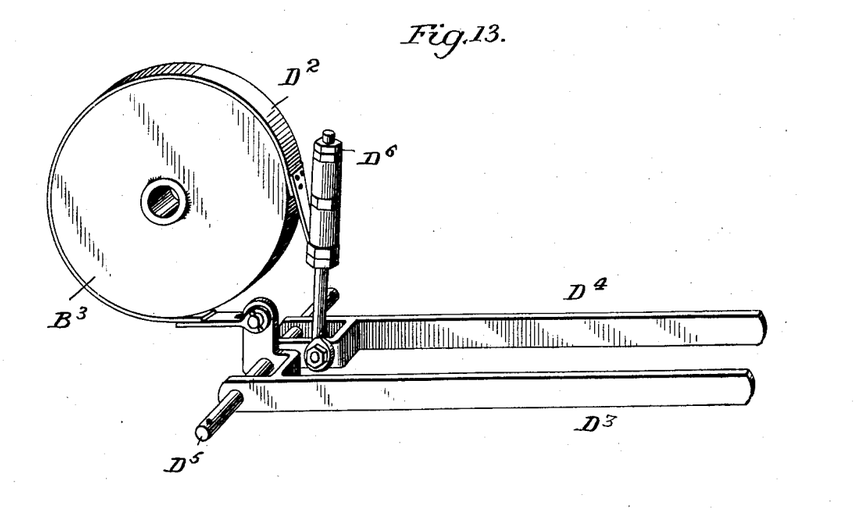
Fig. 13 is a perspective, and Fig. 14 a plan, view, on an enlarged scale, showing the brake-wheel, band, and levers for operating them.
Figure 14:
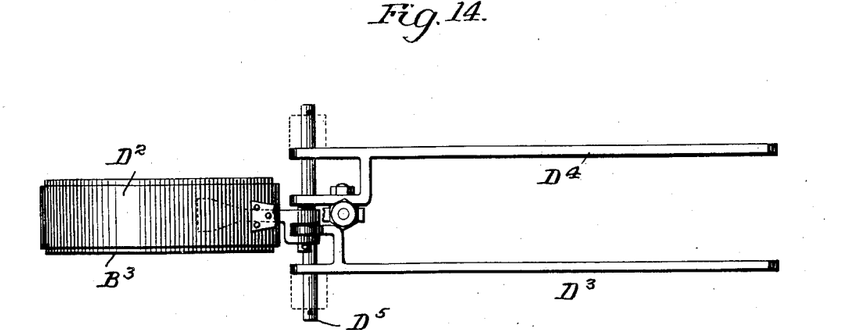

Having thus described the mechanical embodiments of the invention illustrated in the drawings, which are shown as typical only in the broad sense of the invention, I will now proceed to describe the operation, referring more particularly to the diagrammatic illustrations of the circuits in Figs. 11 and 12, wherein the principal operating devices are lettered similar to those already described, Fig. 11 showing an arrangement for multiphase circuits and Fig. 12 for single-phase circuits.

1, 2, and 3 represent the main-line conductors for a two or three phase motor-circuit, and this is shown in connection with the motor B, the switch-arms $E'$ $E^2$, brake-magnets D $D'$, and stop-magnet F, before described, and in the present illustration I have adopted, substantially, the push-button system shown in my application before referred to, in which there is a floor-controller M, which is rotated in accordance with the movements of the elevator and is provided with a number of brushes $m'$ $m^2$ $m^3$ $m^4$, according to the number of floors or stopping-places to be provided for, and there are a number of push-buttons $P'$ $P^2$ or other suitable circuit-closing devices, according to the number of floors or stopping-places. Arranged in the circuits are the magnets N, with its armature $N'$ O and armature $O'$ Q, with its armature $Q'$ and the auxiliary magnets R S and armatures $R'$ $S'$, respectively.

One of the main lines, as 1, leads through the door-contacts 4 4 through the conductor $1^a$, and this conductor $1^a$ extends through the coils of the magnet Q, which are wound in opposition, and thence through the contacts 5, which are normally closed, to the branches leading to the push-buttons $P'$ $P^2$. From the push-button contacts there extend branches of conductor $1^a$ in the form of conductors $1^b$ $1^c$, leading, respectively, to the magnets N and O and thence to the brushes $m'$ and $m^3$ of the floor-controller M. From the brush $m^2$ leads a conductor $1^d$, having two branches. One, as $1^e$, leads through the resistance $r$, through the conductor $1^f$, to the main line 3, while the other branch $1^g$ leads through the coils of the magnet S to the contact-point $e$ of the switch-arm $E'$. From the contact-point $e'$ there is a conductor $1^h$ including the coils of the brake-magnet D and connected to the core of the magnet S, and from the armature $S'$ of said magnet there is a conductor $1^i$, connected to the main line 2, and this conductor 2 is connected to those portions of the switch-arms $E'$ $E^2$ which operate on contacts $e^7$ $e^8$. The brush $m^4$ is connected by conductor $1^k$ through the resistance $r'$ and conductor $1^f$ to the main line 3, and a branch $1^l$ leads through the coils of the auxiliary magnet R to conductor $1^g$, to contact $e$, which is electrically connected to the contact $e^2$ on the switch-arm $E^2$. To the contact $e^3$ is connected a conductor $1^m$, including the coils of the brake-magnet $D'$, and the core of the auxiliary magnet R and the armature $R'$ is connected by a conductor $1^n$ to the main line 2, and this main line 2 is also connected to that portion of the switch-arm $E^2$ which operates on contact $e^8$. The terminal $b$ on the motor B is connected directly to the main-line conductor 1. The terminal $b'$ is connected to the contacts $e^4$ and $e^8$, respectively, of the switch-arms $E'$ $E^2$. The terminal $b^2$ is connected to the contacts $e^7$ and $e^9$ of the switch-arms. The contacts $e^4$ and $e^8$ of the switch-arms are also connected by conductor 6 through the contacts 7 of the magnet Q, which are normally closed, through the coil of the stop-magnet F, and thence to the contacts $e^7$ $e^9$ of the switch-arms.

When the motor is at rest, the circuits are as indicated in the diagram and the contacts $e$ $e'$ and $e^2$ $e^3$ are closed. Assuming now that one of the push-buttons, as $P'$, is closed by the operator, the circuit may be traced as follows: through the conductor $1^a$, through the door-contacts 4, to the coils of the magnet Q, contacts 5, push-button $P'$, conductor $1^b$, magnet N, to brush $m'$ of the floor-controller, brush $m^2$ thereof, where it branches, one portion going through the conductor $1^e$, resistance $r$, and conductor $1^f$ to the main line 3, while the other portion passes through conductor $1^g$, coils of the auxiliary magnet S, to contacts $e$ $e^2$ of the switch-arms E' and $E^2$, to the main-line conductor 3. This circuit energizes magnet N, causing it to attract its armature N', and it will be seen that this armature is connected between the opposition coils of the magnet Q, and this will form a short circuit including only one of the coils of magnet Q and the armature N', and this coming in contact with the armature N will close the short circuit around the push-button P', and this causes the magnet Q to attract its armature, breaking the contacts 5 and 7, carried by the armature Q', and the push-button is cut out of circuit. The magnet S being also energized attracts its armature S', closing the circuit leading from the main-line conductor 2 through the conductor $1^i$, the core of magnet S, the conductor $1^h$, including the coils of the brake-magnet D, to contact $e'$ of the switch-arm E'. The brake-magnet D being thus energized, it attracts its armature, lifting link L and operating the switch E' to break the contacts $e$ $e'$ and close the contacts $e^4$ $e^7$, controlling the motor-circuit, which receives its current from the main line, causing it to operate in the required direction to move the elevator as desired.

When the elevator reaches the desired position, which in this instance is represented by the push-button P', the floor-controller M has rotated so that the brush $m'$ reaches the insulated portion thereof and the operating-circuit is interrupted. Consequently the magnet N releases its armature, breaking the shunt or parallel circuit around the push-button, and magnet Q releases its armature, closing contacts 5 and 7, 5 establishing the operating-circuit ready for the next operation of the push-button, and 7 closing the circuit through the stop-magnet F between the main-line conductors 2 and 3. The stop-magnet F thus operates to move the catch J, releasing the link L, which allows the brake-lever $D^3$ to drop, applying the brake, and this at the same time moves the switch E' to break the contacts $e^4$ $e^7$ and close contacts $e$ $e'$, and the motor is thus deprived of its power and the parts are in condition for operation again.

It will be seen that the brake-magnet D is energized only a short time, its function being to lift its core and its connected brake-lever and operate the switch, which being done the circuits of the motor are closed and the motor operates until the operating-circuit is broken by the floor-controller.

If push-button $P^2$ is operated, the same series of operations will take place, except that brake-magnet D' is energized, operating switch-arm $E^2$, and the circuits through the motor are controlled so that it will operate in the proper direction to bring the elevator to the desired floor, and it is not deemed necessary to trace the circuits in detail.

It will be observed that the circuit of the stop-magnet F is controlled by the operating-circuit through the magnet Q and its armature, and this operating-circuit is controlled by the floor-controller M, moving in harmony with the elevator.

When a single-phase motor is used, the circuits are preferably arranged as indicated in Fig. 12, the operation being identically the same as that described in connection with Fig. 11 except that one main-line conductor 1 is omitted and the motor is provided with a starting device or controlled by the governor G, and the circuits of this governor are controlled by the contacts $g^2$ $g^3$ $g^4$ $g^5$ $g^7$ $g^8$, which are made and broken by the governor operating as hereinbefore set forth. In this arrangement the switches E' $E^2$ are provided with more contacts, as clearly shown, which contacts control the circuits not only through the motor, but through the motor-governor G, as clearly indicated, and therefore not necessarily described in detail, it being understood that X and X' indicate, respectively, the inductive and non-inductive resistances controlled by the governor G.

It is desirable and, indeed, necessary, in order to render the operation of the motor certain, since a single-phase motor will run in either direction under the action of a single-phase current, its direction of rotation depending on the impulse it receives at starting, to provide means whereby the motor must come to rest and the starting-contacts be established before the reversing-switch is operated after the stop operation has once been made. I therefore provide the governor-switch G with the contacts $g^7$ $g^8$, which are connected in the conductor $1^g$ of the push-button or other control-circuit, and it will be seen that when the catch $G^8$ of the governor is moved away from the arm $G^7$ the control-circuit $1^g$ is broken at the contacts $g^7$ $g^8$, and the motor proceeds to operate in the proper direction and cannot be interfered with by the operation of any of the push-buttons. When, however, the motor stops and the contacts $g^7$ $g^8$ are closed and then the reversing-switch being first operated to determine the direction of operation of the motor, the governor operates as before and again breaks the control-circuit.

It will thus be seen that I provide an efficient apparatus or system whereby an alternating-current motor can be controlled through the medium of a simple push-button or other circuit-controller connected in an operative circuit and arranged to automatically operate the circuit-reversing switch of the motor, and at the same time and by the same means the brake device is also operated automatically to release and apply the brake, and in the present instance I make the brake-operating device the medium for controlling the circuit-reverser of the motor, so that the brake and motor are controlled in harmony with each other. So, also, in connection with single-phase motors, I provide means for controlling the starting-circuit of the motor, and these means are arranged to automatically break the starting-circuit when the motor attains sufficient speed to operate without the aid of the starting-circuit. In the operating-circuit described it will be observed that in order to operate the motor it is only necessary to press the push-button or circuit-controller for an instant, when the motor will be started and operate until automatically stopped by means of the floor-controller, and while this is a preferable embodiment of the invention any other operating-circuit embodying controlling devices which shall control the switch to start, stop, and reverse the alternating-current motor may be substituted for those shown. It will also be observed that I have described an improved construction of the brake apparatus, and while this is found especially applicable for this purpose it will be understood that the brake may be used in connection with other devices and that other brake apparatus can be used in place of the one described.

From the above description the general principles of my invention will be readily understood by those skilled in the art, and it will be understood that the details of construction and arrangement of parts and circuits can be varied to suit the requirements of any particular case.

What I claim is—

1. The combination with an alternating-current motor, of a switch device controlling the circuits of the motor, a governor controlling the starting-circuits of the motor, and an operating-circuit for said switch device including circuit-controllers whereby the movements of the alternating-current motor can be controlled by operating said controllers, substantially as described.

2. The combination with an alternating-current motor, of a switch device controlling the circuits of the motor, a governor controlling the starting-circuits of the motor, a brake device for the motor, and an operating-circuit for said switch device including circuit-controllers, whereby the movements of the alternating-current motor and brake can be controlled by operating said controllers, substantially as described.

3. The combination with an elevator-operating mechanism, of an alternating-current motor connected to operate the same, a switch device controlling the circuits of the motor, a governor controlling the starting-circuits of the motor, an operating-circuit for said switch device including circuit-controllers, and automatic means connected with the elevator-operating mechanism controlling the circuits of the motor, substantially as described.

4. The combination with a motor, of a switch device controlling the circuits of the motor, a brake device for the motor, and connections between the brake device and switch device for operating the latter, substantially as described.

5. The combination with a motor, of a switch device controlling the circuits of the motor, an electromagnetic brake device for the motor, and connections between the brake device and switch whereby the latter is controlled by the brake-operating magnets, substantially as described.

6. The combination with a motor, of a switch device controlling the circuits thereof, an electromagnetic brake device, and connections between the brake device and switch for operating the latter, the brake device being provided with a magnet for releasing the brake and closing the switch to start the motor and with a stop-magnet to apply the brake and stop the motor, substantially as described.

7. The combination with a motor, of a switch device controlling the circuits thereof, a governor controlling the starting-circuits of the motor, an electromagnetic brake device for the motor said brake device being provided with a magnet for releasing the brake and closing the circuit of the motor to start the same and with devices for applying the brake and breaking the circuit of the motor, substantially as described.

8. The combination with a motor, of a switch controlling the circuits of the motor, an electromagnetic brake device for the motor including a weighted lever, a magnet connected to operate the lever, and a link connected to the lever and operating the switch, substantially as described.

9. The combination with a motor, of a switch controlling the circuits of the motor, an electromagnetic brake device for the motor including a weighted lever, a magnet the core of which is connected to move the lever, a link connected to the lever for operating the switch, a catch connected to operate with the link, and a stop device for releasing the catch, substantially as described.

10. The combination with a motor, of a switch controlling the circuits of the motor, an electromagnetic brake device for the motor, including a weighted lever, a magnet the core of which is connected to move the lever, a link connected to the lever for operating the switch, a catch controlling the link, and a stop-magnet for releasing the catch, substantially as described.

11. The combination with an alternating-current motor, of a governor controlling the starting-circuit of the motor said governor including a contact-carrying arm, a catch therefor, a compression-spring and weighted arms, and connections whereby the starting-circuit of the motor is broken, substantially as described.

12. The combination with an alternating-current motor, of a governor controlling the starting-circuit of the motor said governor including weighted arms, a contact-carrying arm, a spring-actuated catch therefor, a compression-spring, an arm controlling the compression-spring, and connections between the arm and the weighted arms of the governor, substantially as described.

13. The combination with an alternating-current motor, of a governor controlling the starting-circuit of the motor said governor comprising weighted arms, a spring-contact, a contact-carrying arm, a catch for the arm, a compression-spring, and connections between the compression-spring and the weighted arms of the governor, substantially as described.

14. The combination with an alternating-current motor, of a governor controlling the starting-circuit of the motor, and a circuit-reversing switch operated by a controlling-circuit, said controlling-circuit including contacts controlled by the governor, substantially as described.

In testimony whereof I have signed my name to this specification in the presence of two subscribing witnesses.

JOHN D. IHLDER.

Witnesses:
JAMES S. FITCH,
AETHUR ROWLAND.